United States Patent [19]
Turner et al.

[11] Patent Number: 5,797,622
[45] Date of Patent: Aug. 25, 1998

[54] SNAP-ON STEERING WHEEL WITH INTEGRAL AIRBAG HOUSING

[75] Inventors: Darin James Turner, Warren; Gregory Neil Goestenkors, Waterford; Daniel Gene Zelenak, Lake Orion, all of Mich.

[73] Assignee: AlliedSignal Inc., Morristown, N.J.

[21] Appl. No.: 733,894

[22] Filed: Oct. 18, 1996

Related U.S. Application Data

[63] Continuation of Ser. No. 456,086, May 31, 1995, abandoned.

[51] Int. Cl.⁶ .................................................. B60R 21/16
[52] U.S. Cl. ........................ 280/731; 280/728.2; 74/492
[58] Field of Search .......................... 280/731, 728.2, 280/728.1, 779; 74/552, 492, 556

[56] References Cited

U.S. PATENT DOCUMENTS

| | | | |
|---|---|---|---|
| 4,607,539 | 8/1986 | Arima et al. | 74/492 |
| 4,903,988 | 2/1990 | Jambor et al. | 74/492 X |
| 5,085,466 | 2/1992 | Nakatsuka et al. | 280/731 X |
| 5,277,442 | 1/1994 | Cuevas | 280/731 |
| 5,333,897 | 8/1994 | Landis et al. | 280/728.2 |
| 5,409,256 | 4/1995 | Gordon et al. | 280/731 X |
| 5,462,305 | 10/1995 | Hamada | 280/728.2 |

FOREIGN PATENT DOCUMENTS

| | | | |
|---|---|---|---|
| 94 07 807 | 7/1994 | Germany. | |
| 2 282 574 | 4/1995 | Germany. | |
| 44 15 765 | 11/1995 | Germany. | |
| 2242871 | 10/1991 | United Kingdom | 280/731 |

*Primary Examiner*—Christopher P. Ellis
*Attorney, Agent, or Firm*—Markell Seitzman

[57] ABSTRACT

A snap-on steering wheel assembly is provided with an integral airbag housing. The assembly includes a steering wheel having a hub, a plurality of support arms extending from the hub, and a rim connected to the support arms. An airbag housing is formed integrally with the hub for supporting the airbag. The hub is adapted for mating with a steering column shaft. A snap-on attachment arrangement is provided in cooperation between the hub and the steering column shaft so that the steering wheel may be snapped onto the steering column shaft.

19 Claims, 4 Drawing Sheets

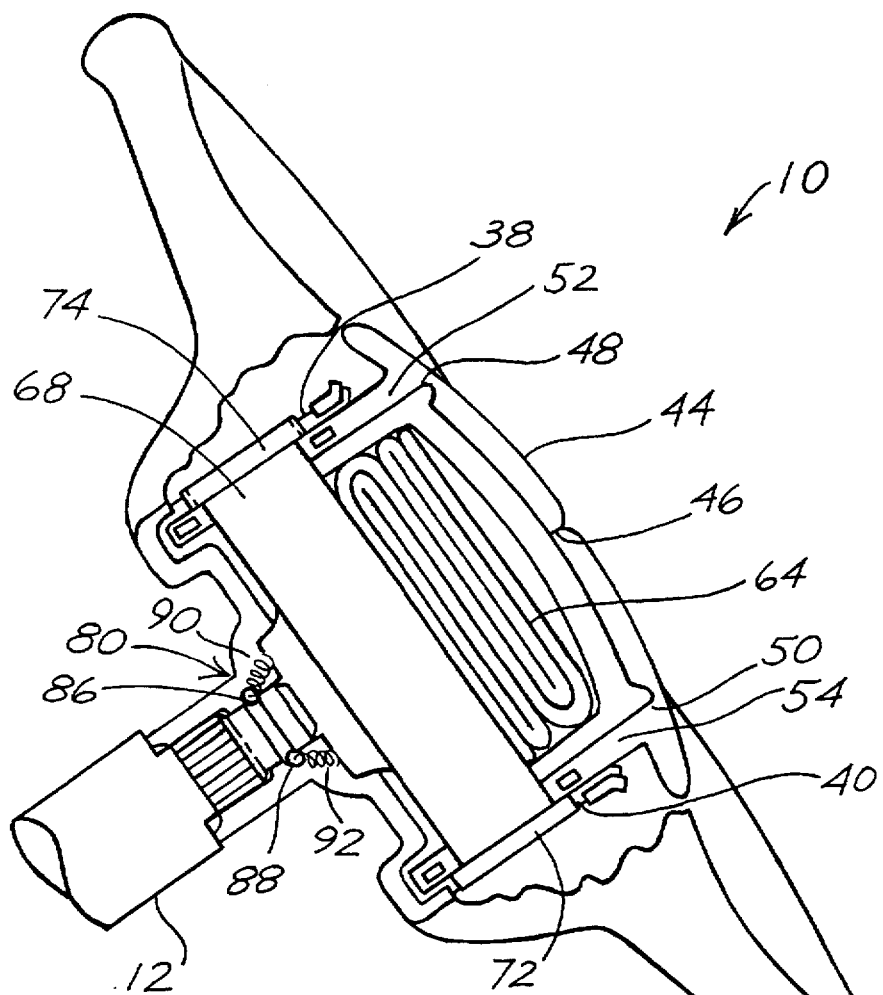
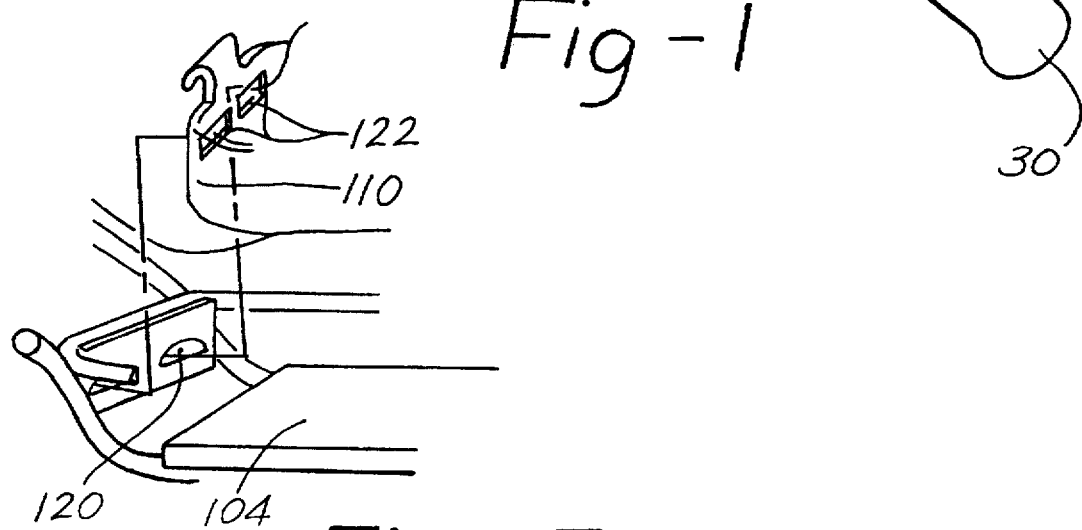

SNAP-ON STEERING WHEEL WITH INTEGRAL AIRBAG HOUSING

This application is a continuation of application Ser. No. 08/456,086 filed May 31, 1995, now abandoned.

TECHNICAL FIELD

This invention relates to vehicle steering wheel, and more particularly to an apparatus for housing an airbag in a vehicle steering wheel.

BACKGROUND ART

In prior art steering wheel assemblies, the steering wheel generally comprises a hub with an aperture therethrough for receiving the steering column shaft, support arms extending from the hub, and a steering wheel rim with grips for the driver. Typically, the steering column shaft extends through the hub and a nut is placed on the end of the steering column shaft to secure the hub to the shaft. Generally, the end of the shaft and the nut protrude from the hub a certain distance toward the rear of the vehicle. An airbag housing is connected to the hub at a position sufficiently away from the hub to provide clearance for the protruding end of the steering column shaft as well as the nut. This protrusion necessitates moving the airbag housing away from the hub and wastes valuable space in the steering wheel, which adversely effects design flexibility for the steering wheel and airbag module. Also, in the prior designs, it is generally necessary to insert a number of attachment screws into the airbag housing from the side of the hub adjacent the instrument panel after the steering wheel has been attached to the steering column shaft. This attachment can be problematic because it may be awkward to reach behind the steering wheel in order to drive the attachment screws.

It is desirable to provide a vehicle steering wheel which attaches to the steering column shaft at the instrument panel side of the steering wheel hub in order to eliminate the clearance requirement for the protruding end of the steering column shaft and nut which typically protrude beyond the hub and necessitate distancing the airbag housing from the hub.

It is further desirable to provide a vehicle steering wheel design which is compact and adaptable to varying steering wheel and airbag assembly designs.

It is also desirable to provide a vehicle steering wheel design which easily attaches to a steering column shaft without the need for a nut attachment to the steering column shaft or screws driven in from the rear of the hub to secure the airbag housing.

SUMMARY OF THE INVENTION

This invention contemplates a vehicle steering assembly for use with an airbag. The assembly comprises a steering wheel having a hub, a plurality of support arms extending from the hub, and a rim connected to the support arms. An airbag housing is formed integrally with the hub for supporting the airbag. The hub is adapted for mating with a steering column shaft.

This invention further contemplates a vehicle steering wheel assembly comprising a steering column shaft. A steering wheel hub has a central aperture formed therethrough for mating with the steering column shaft. A plurality of support arms extend from the hub. A steering wheel rim is connected to the support arms. A snap-in locking mechanism cooperates between the hub and the steering column shaft for securing the hub to the steering column shaft as the hub is mated to the steering column shaft.

An object of the present invention is to provide a snap-on steering wheel assembly which allows the airbag housing to be formed integrally with the steering wheel hub. The steering wheel design is easy to install and inexpensive to manufacture. Both the steering wheel and the airbag cover assembly snap into place without the need for attachment nuts or screws.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 shows a vertical cross-section of a fully assembled vehicle steering assembly in accordance with the present invention;

FIG. 5 shows an exploded perspective view of an alternative module assembly attachment in accordance with the present invention.

DETAILED DESCRIPTION OF THE PREFERRED EMBODIMENT

Figure 2:
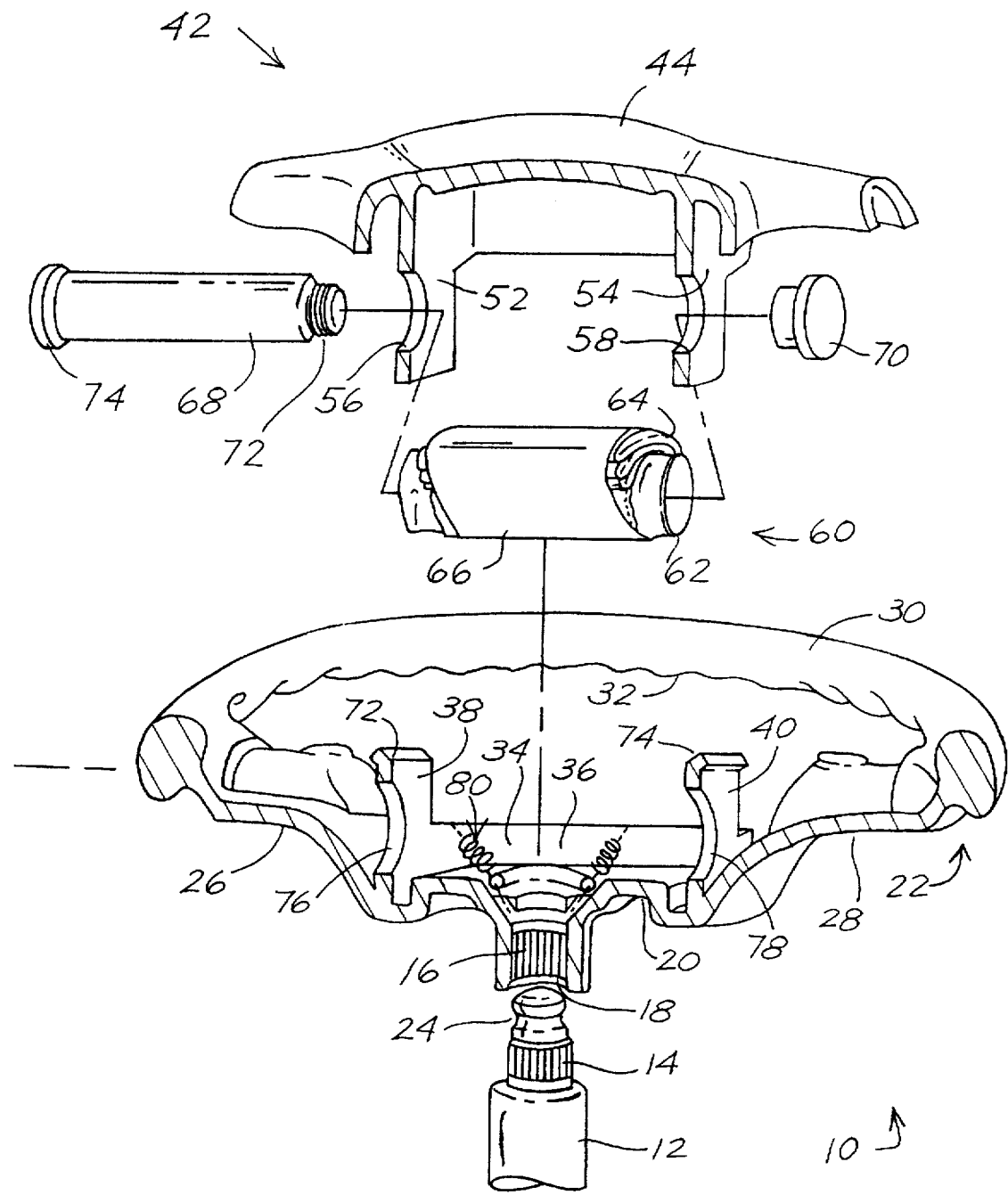
FIG. 2 shows an exploded cut-away side view of a steering wheel assembly in accordance with the present invention.

FIG. 1 shows a vertical cross-section of a fully assembled snap-on steering wheel with integral airbag housing. The steering assembly is generally indicated by reference numeral 10. A partially cut-away exploded side view of the steering assembly 10 is shown in FIG. 2.

The steering assembly 10 includes a steering column shaft 12. The steering column shaft 12 includes splines 14 which are mateable with the splines 16 formed in the aperture 18, which extends through the hub 20 of the steering wheel 22. The steering column shaft 12 further includes a groove 24 formed therein.

The steering wheel 22 includes the hub 20, a pair of support arms 26,28 extending from the hub, and a rim 30 with fingergrips 32 formed thereon.

The steering wheel 22 includes an airbag housing 34 formed integrally with the hub 20. The airbag housing 34 includes side walls 36 extending from the hub 20, and a pair of end flanges 38,40 extending from the hub 20 in cooperation with the side walls 36 to form the airbag housing 34. The end flanges 38,40 are flexible in order to allow insertion of the cover assembly 42 therebetween.

The module assembly 42 includes a cover 44 with a tear seam 46 (FIG. 1) in the middle thereof to facilitate airbag deployment. At the hinges 48,50 of the cover 44, a pair of legs 52,54 extend from the cover. The legs 52,54 have apertures 56,58 formed therethrough. The bag pack assembly 60 includes a manifold 62 with an airbag 64 wrapped therearound. A TYVEK cover 66 secures the airbag 64 to the manifold 62. The bag pack assembly 60 is inserted between the legs 52,54 and aligned with the apertures 56,58. The inflator 68 is then inserted through the aperture 56, through the manifold 62, and beyond the aperture 58, whereupon the end cap 70 is screwed onto the threaded portion 72 of the inflator 68 to secure the inflator 68 and backpack assembly 60 to the legs 52,54.

The module assembly 42 may then be easily inserted onto the steering wheel 22 by pressing the module assembly 42 between the flanges 38,40. The ramped surfaces 72,74 on the flanges 38,40 help guide the legs 52,54 of the cover assembly 42 into the airbag housing 34. The flanges 38,40 are flexible, and bend to allow the legs 52,54, as well as the end caps 70,74 of the inflator 68, to snap into position between the flanges 38,40. The end caps 70,74 are of sufficient diameter to fit into the apertures 76,78 which are formed through the flanges 38,40. Once the cover assembly 42 is sufficiently pressed toward the hub 20, the end caps 70,74 snap into the apertures 76,78, and the flanges 38,40 spring back to a substantially parallel position with respect to each other to secure the cover assembly onto the steering wheel 22. At this point, the steering wheel 22 is fully assembled and ready for mating with the steering column shaft 12.

In order to mate the fully assembled steering wheel 22 with the steering column shaft 12, the steering wheel 22 is simply pressed onto the end of the steering column shaft 12. The snap-on locking mechanism 80 cooperates between the hub 20 and the steering column shaft 12 to secure the steering wheel 22 with respect to the shaft 12. The snap-on locking mechanism 80 is more clearly shown in the enlarged FIG. 3.

Figure 3:
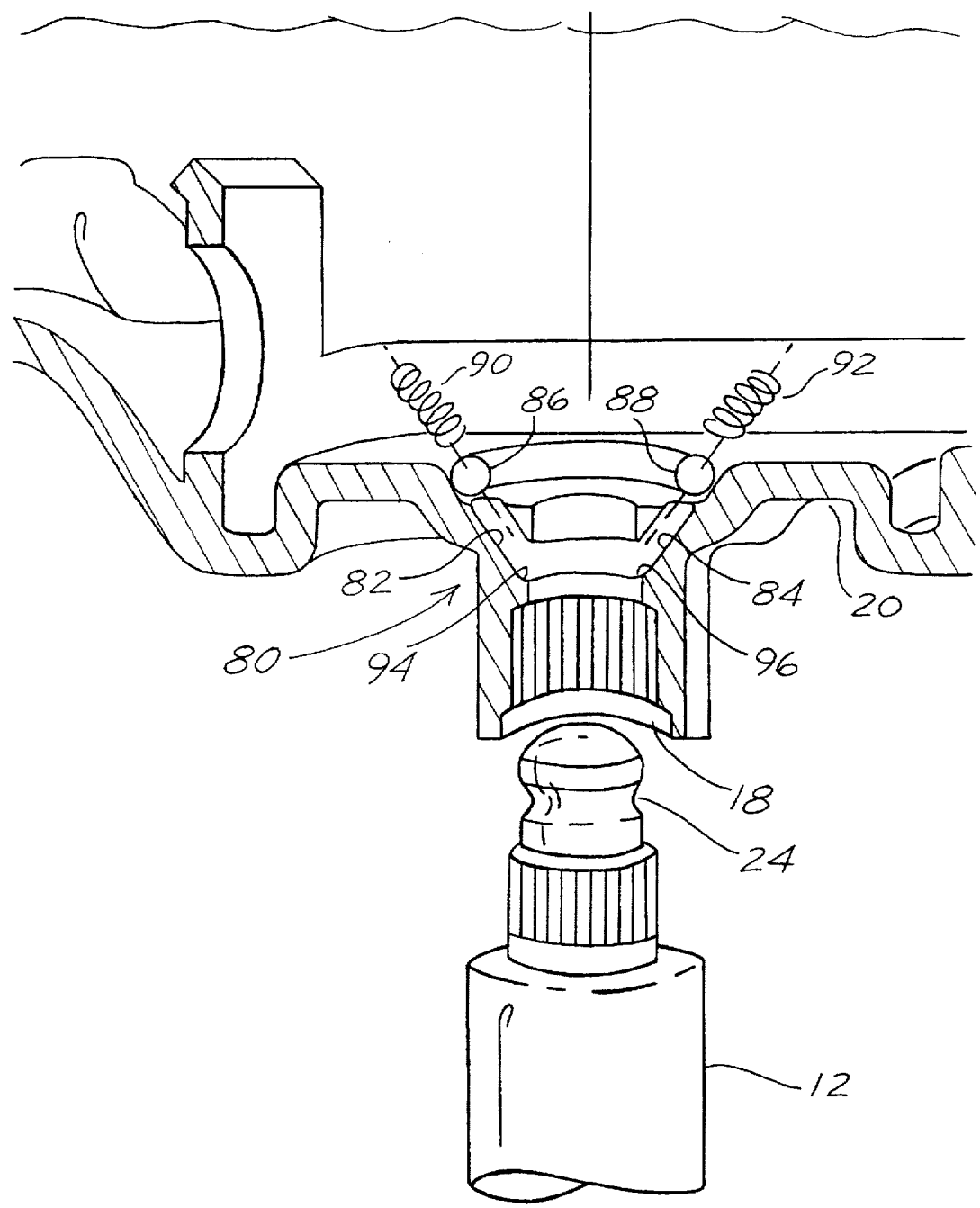
FIG. 3 shows an enlarged view of the snap-on attachment mechanism taken from FIG. 2 in accordance with the present invention.

Referring to FIG. 3, the snap-on locking mechanism 80 is shown. The locking mechanism 80 includes a pair of slots 82,84 formed in the hub 20 in communication with the aperture 18 formed in the hub 20. A pair of retainer balls 86,88 are movable in the slots 82,84 respectively. The pair of springs, 90,92 bias the respective ball 86,88 toward the groove 24 in the steering column shaft 12. Each slot 82,84 includes a slot detent 94,96 formed therein for receiving the respective ball. Once the hub 20 is inserted onto the steering column shaft 12, the springs 90,92 bias the retainer balls 86,88 to a position between the groove 24 and the respective detent 94,96. In this position, the balls 86,88 lock the hub 20 onto the steering column shaft 12, as the balls are pinched between the groove 24 and the respective detent 94/96. It is understood that one skilled in the art will appreciate many other similar snap-on locking mechanisms to facilitate locking the hub to the steering column shaft. These design variations are contemplated to be part of the present invention, as described in the appended claims.

Using this snap-on locking configuration, the fully assembled steering wheel assembly is simply snapped into position on the steering column shaft, and the springs 90,92 move the retainer balls 86,88 into a pinched position between the groove 24 and the respective slot detent 94,96 to prevent removal of the steering wheel from the steering column shaft. In this manner, the steering column shaft does not protrude through the hub 20 for attachment, therefore the airbag housing may be formed integrally with the hub. Forming the airbag housing integrally with the hub reduces the depth of the steering wheel assembly, and increases design flexibility.

Figure 4:
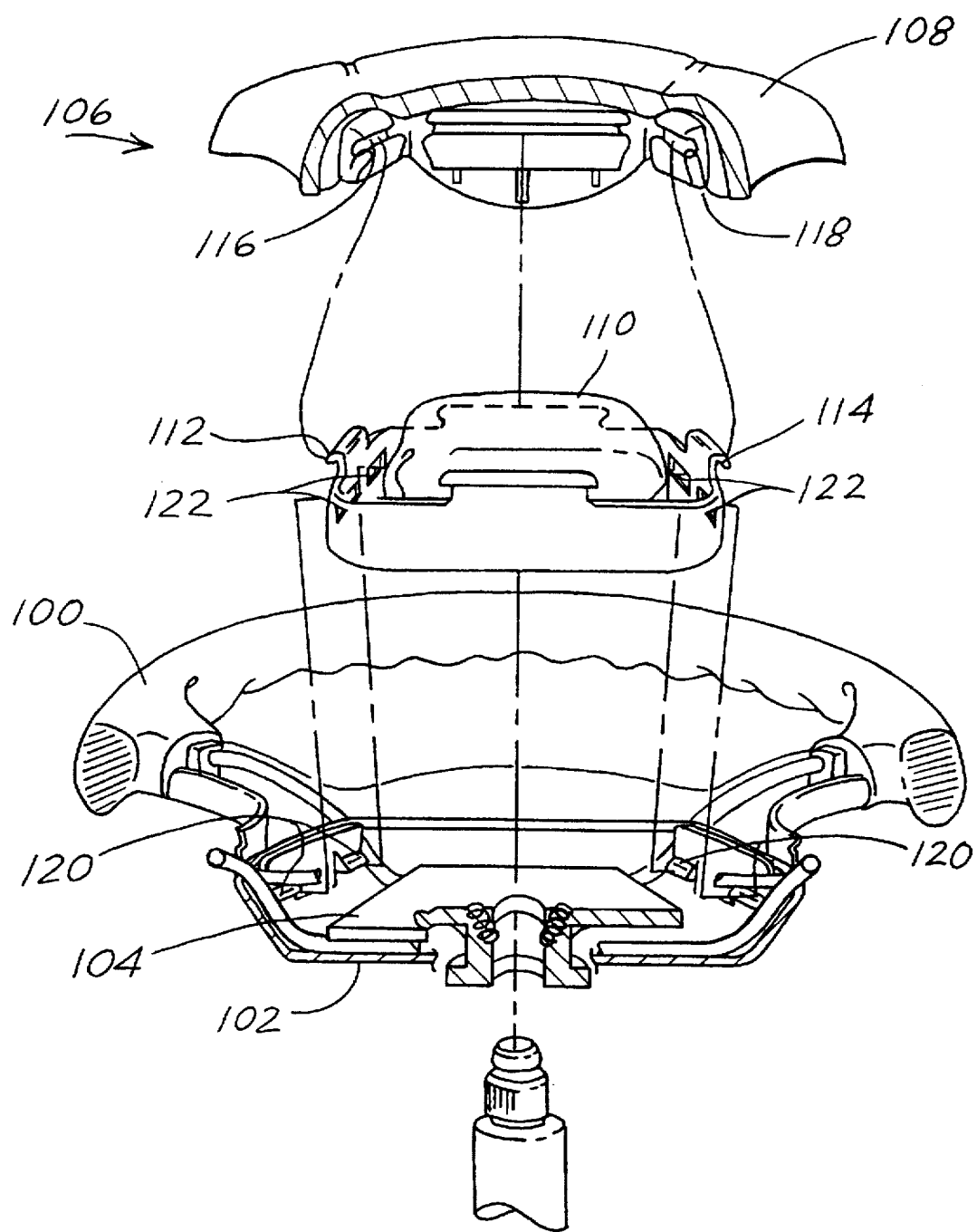
FIG. 4 shows an exploded cut-away side view of an alternative steering wheel assembly in accordance with the present invention.

FIG. 4 shows an alternative vehicle steering assembly in accordance with the present invention. The assembly comprises a steering wheel 100 having a hub 102. The hub 102 forms an airbag housing 104 thereon for receiving the module assembly 106. The module assembly 106 includes a cover 108 and an auxiliary housing 110 having a bag pack assembly (not shown) secured therein. The auxiliary housing includes a pair of tabs 112, 114 extending therefrom for engagement with a corresponding pair of slots 116, 118 formed in the cover 108. The airbag housing 104 includes a plurality of tabs 120 extending therefrom for cooperation with a plurality of slots 122 formed in the auxiliary housing 110, as shown in FIG. 5. In this manner, the auxiliary housing 110, including its bag pack assembly, may be snapped into the cover 108 to form the module assembly 106. The module assembly 106 may then be snapped into the airbag housing 104 by engaging the tabs 120 with the slots 122.

While the best modes for carrying out the invention have been described in detail, those familiar with the art to which this invention relates will recognize alternative designs and embodiments for practicing the invention. Thus, the above described preferred embodiments are intended to be illustrative of the invention which may be modified within the scope of the following appended claims.

What is claimed is:

1. A vehicle steering assembly for use with an airbag, comprising:

a steering wheel including a hub, a rim connected to the hub, and an airbag housing formed integrally with the hub, the air bag housing including a pair of flexible flanges extending from the hub, each said flange having an aperture formed therethrough; said hub being adapted for mating with a steering column shaft;

an airbag module assembly including an inflator and a bag pack assembly, and a cover being engagable with said airbag housing for securing the cover to the steering wheel, the cover including a pair of legs with apertures formed therethrough for receiving the inflator.

2. The vehicle steering assembly of claim 1, wherein said inflator includes first and second end parts for engagement with said apertures formed in said pair of flanges.

3. The vehicle steering assembly of claim 1, for use in combination with a steering column shaft, and further comprising a snap-on locking mechanism in cooperation between the hub and the steering column shaft for securing the hub to the steering column shaft as the steering wheel is mated with the steering column shaft.

4. The vehicle steering assembly of claim 1, further comprising an airbag module assembly including a cover, an auxiliary housing engageable with said cover, and a bag pack assembly carried by the auxiliary housing, said cover assembly being engageable with the airbag housing for securing the module assembly to the steering wheel hub.

5. The vehicle steering assembly of claim 4, further comprising a first pair of slots formed in one of said airbag housing and said auxiliary housing, and a corresponding first pair of tabs extending from the other of said airbag housing and said auxiliary housing for engagement in the respective slots to secure the auxiliary housing with respect to the airbag housing.

6. The vehicle steering assembly of claim 5, further comprising a second pair of slots formed in one of said cover and said auxiliary housing, and a corresponding second pair of tabs extending from the other of said cover and said auxiliary housing for engagement in the respective slots to secure the cover with respect to the auxiliary housing.

7. A vehicle steering wheel assembly, comprising:

a preassembled steering wheel and airbag assembly, the steering wheel including a hub, having a central aperture formed therethrough for mating with a steering column shaft, and a rim connected to said hub;

the airbag assembly comprising an air bag, inflator for inflating the air bag and a cover for covering the air bag and inflator, the air bag assembly mounted to the steering wheel concealing the central aperture of the hub prior to the steering wheel being mounted upon the steering column shaft and a snap-on locking mechanism cooperating with the hub and the steering column shaft for locking the steering wheel and air bag assembly to the steering column shaft, without the use of a threaded connector, as the hub is slid about the steering column shaft.

8. A vehicle steering wheel assembly, comprising:

a steering column shaft having a peripheral groove formed therein;

a steering wheel hub having a central aperture formed therethrough for mating with said steering column shaft; a steering wheel rim connected to said hub; and a snap-on locking mechanism in cooperation between the hub and the steering column shaft adapted for securing the hub to the steering column shaft as the hub is mated to the steering column shaft, wherein said locking mechanism comprises:

at least one slot formed in said hub in communication with said central aperture, said slot having a slot detent formed therein;

a retainer ball movable in said at least one slot and engageable between said groove and said slot detent for securing said steering wheel hub with respect to said steering column shaft when the steering wheel is mated with the steering column shaft.

9. The vehicle steering wheel assembly of claim 8, wherein said locking mechanism further comprises a spring disposed within said at least one slot for biasing said retainer ball toward said groove in the steering column shaft to facilitate snap-on locking of the steering wheel.

10. The vehicle steering wheel assembly of claim 9, further comprising an airbag housing formed integrally with the hub for supporting an airbag module.

11. The vehicle steering wheel assembly of claim 10, wherein the airbag module assembly includes an inflator and a bag pack assembly, said module assembly being engageable with said airbag housing for securing the module assembly to the steering wheel hub.

12. The vehicle steering assembly of claim 11, wherein said airbag housing comprises a pair of flexible flanges extending from the hub, each said flange having an aperture formed therethrough.

13. The vehicle steering assembly of claim 12, wherein said module assembly comprises a cover and a pair of legs with apertures formed therethrough for receiving the inflator.

14. The vehicle steering assembly of claims 13, wherein said inflator includes first and second end parts for engagement with said apertures formed in said pair of flanges.

15. A vehicle steering wheel assembly, comprising:

a preassembled steering wheel and airbag assembly, the steering wheel including a hub, having a central aperture formed therethrough for mating with a steering column shaft, an air bag housing formed integrally with the hub, and a rim connected to said hub;

the airbag assembly comprising an air bag, inflator for inflating the air bag and a cover for covering the air bag and inflator, the airbag assembly mated to the air bag housing of the steering wheel concealing the central aperture of the hub prior to the steering wheel being mounted upon the steering column shaft and a snap-on locking mechanism cooperating with the hub and the steering column shaft for lockingly securing the steering wheel and airbag assembly to the steering column shaft, without the use of a threaded connector, as the hub is slid about the steering column shaft.

16. The vehicle steering assembly of claim 15, wherein the air bag assembly includes an auxiliary housing engageable with said cover and the air bag housing, said cover being engageable with the auxiliary housing.

17. The vehicle steering assembly of claim 16, further comprising a first pair of slots formed in one of said air_bag housing and said auxiliary housing, and a corresponding first pair of tabs extending from the other of said air_bag housing and said auxiliary housing for engagement in the respective slots to secure the auxiliary housing with respect to the air_bag housing.

18. A vehicle steering wheel assembly, comprising:

a steering column shaft having a peripheral groove formed therein;

a steering wheel hub having a central aperture formed therethrough for mating with the steering column shaft, and the hub having at least one slot formed therethrough in communication with the central aperture, the slot having a slot detent formed therein;

a retainer ball movable in said at least one slot and engageable between the groove and the slot detent for securing the steering wheel hub with respect to the steering column shaft when the hub is mated with the steering column shaft;

a spring disposed within said at least one slot for biasing the retainer ball toward the groove in the steering column shaft to facilitate snap-on locking of the steering wheel hub;

an airbag housing formed integrally with the hub for supporting an airbag;

an airbag module assembly including an inflator and a bag pack assembly, said module assembly being engageable with said airbag housing for securing the module assembly to the steering wheel hub;

said airbag housing comprising a pair of flexible flanges extending from the hub, each said flange having an aperture formed therethrough;

said module assembly comprising a cover and a pair of legs with apertures formed therethrough for receiving the inflator, said inflator including first and second end caps for engagement with said apertures formed in said pair of flanges;

a plurality of support arms extending from the hub;

a steering wheel rim connected to said support arms; and a snap-on locking mechanism in cooperation between the hub and the steering column shaft adapted for securing the hub to the steering column shaft as the hub is mated to the steering column shaft.

19. A vehicle steering assembly for use with an airbag, comprising:

a steering wheel including a hub, a rim connected to the hub, and an airbag housing formed integrally with the hub including a pair of flexible flanges extending from the hub, each flange including an inflator receiving aperture therethrough, said hub being adapted for mating with a steering column shaft;

an airbag module assembly including an inflator and a bag pack assembly received about the inflator to be inflated by inflation gas;

a cover assembly means for receiving the airbag module having a pair of legs slidingly engagable with a corresponding one of the airbag housing flanges, one end of the inflator extending through a corresponding one of the leg apertures and through a corresponding one of the flange apertures.

* * * * *